(12) United States Patent
Yang et al.

(10) Patent No.: US 8,445,796 B2
(45) Date of Patent: May 21, 2013

(54) ELECTRONIC DEVICE HAVING MISOPERATION PREVENTION BUTTON

(75) Inventors: Xin Yang, Shenzhen (CN); Wei Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/168,997

(22) Filed: Jun. 26, 2011

(65) Prior Publication Data
US 2012/0160650 A1   Jun. 28, 2012

(30) Foreign Application Priority Data
Dec. 24, 2010  (CN) .......................... 2010 1 0604446

(51) Int. Cl.
*H01H 13/72* (2006.01)
(52) U.S. Cl.
USPC .......................................... 200/5 B

(58) Field of Classification Search
USPC ................. 200/5 A, 5 B, 43.01, 43.02, 43.07, 200/43.08, 43.11, 43.13, 43.18
See application file for complete search history.

(56) References Cited

U.S. PATENT DOCUMENTS

| | | | |
|---|---|---|---|
| 6,805,499 B2 * | 10/2004 | Westerweck et al. | 396/448 |
| 7,135,646 B2 * | 11/2006 | Tan | 200/4 |
| 7,262,373 B2 * | 8/2007 | Miura et al. | 200/4 |
| 7,635,817 B2 * | 12/2009 | Asada | 200/14 |

* cited by examiner

*Primary Examiner* — Vanessa Girardi
(74) *Attorney, Agent, or Firm* — Altis Law Group, Inc.

(57) ABSTRACT

An electronic device proofed against unintended consequences when a button is depressed is provided. The electronic device includes a case, a movable pad rotatably received in the case, and a button body movably attached to the case and above the movable pad. The movable pad includes at least one switch arranged thereon. The button body includes at least one protruding post corresponding to the at least one switch and facing to the movable pad. The electronic device further includes a driving member slidably connected to the case and connected to the movable pad, sliding the driving member in one direction effectively isolates the movable pad from the button body, and sliding it in the reverse direction restores the connection.

10 Claims, 3 Drawing Sheets

ELECTRONIC DEVICE HAVING MISOPERATION PREVENTION BUTTON

BACKGROUND

1. Technical Field

The present disclosure relates to electronic devices and, more particularly, to an electronic device having a misoperation prevention button to avoid misoperation when the button is depressed unintentionally.

2. Description of Related Art

Buttons are commonly used in electronic devices, such as mobile phones and displays. When a button is depressed, a corresponding function will be executed. However, if the button is unintentionally depressed, the function executed may cause unintentional loss of data in addition to causing mere annoyance.

It is desirable to provide an electronic device which can prevent unintended execution of functions when a button is depressed, to solve the problems mentioned above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references mean at least one.

Figure 1:
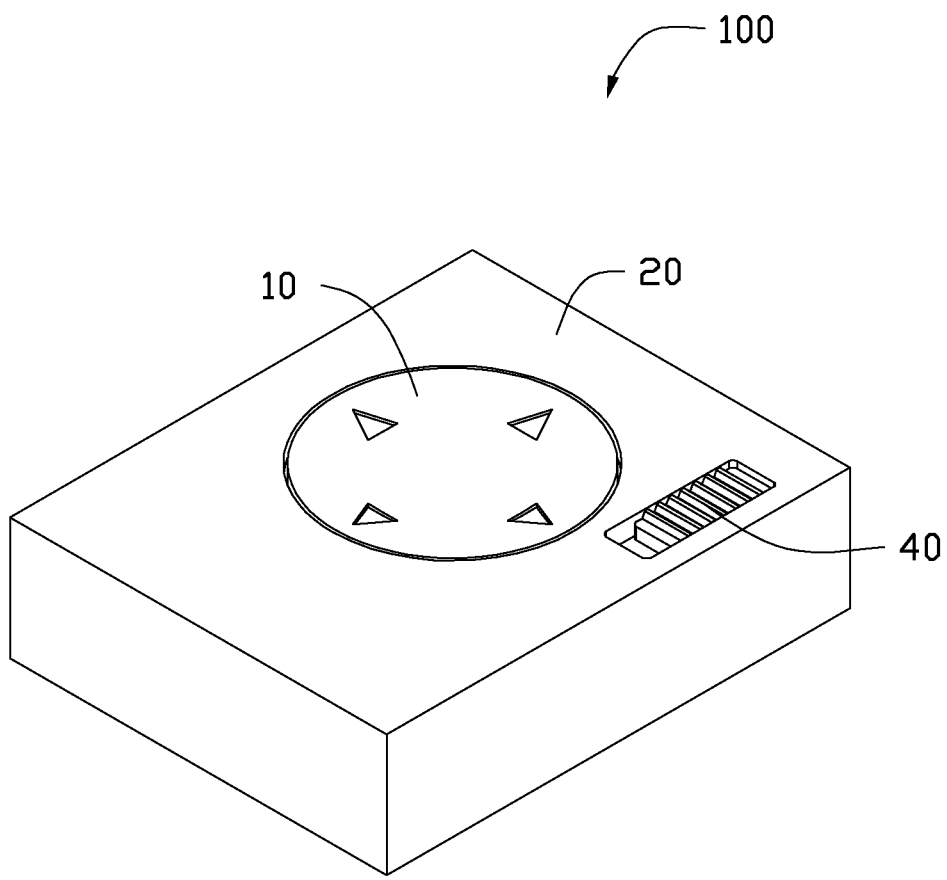
FIG. 1 is an isometric view of an electronic device capable of avoiding misoperation when a button is depressed unintentionally, in accordance with an exemplary embodiment.
Figure 2:
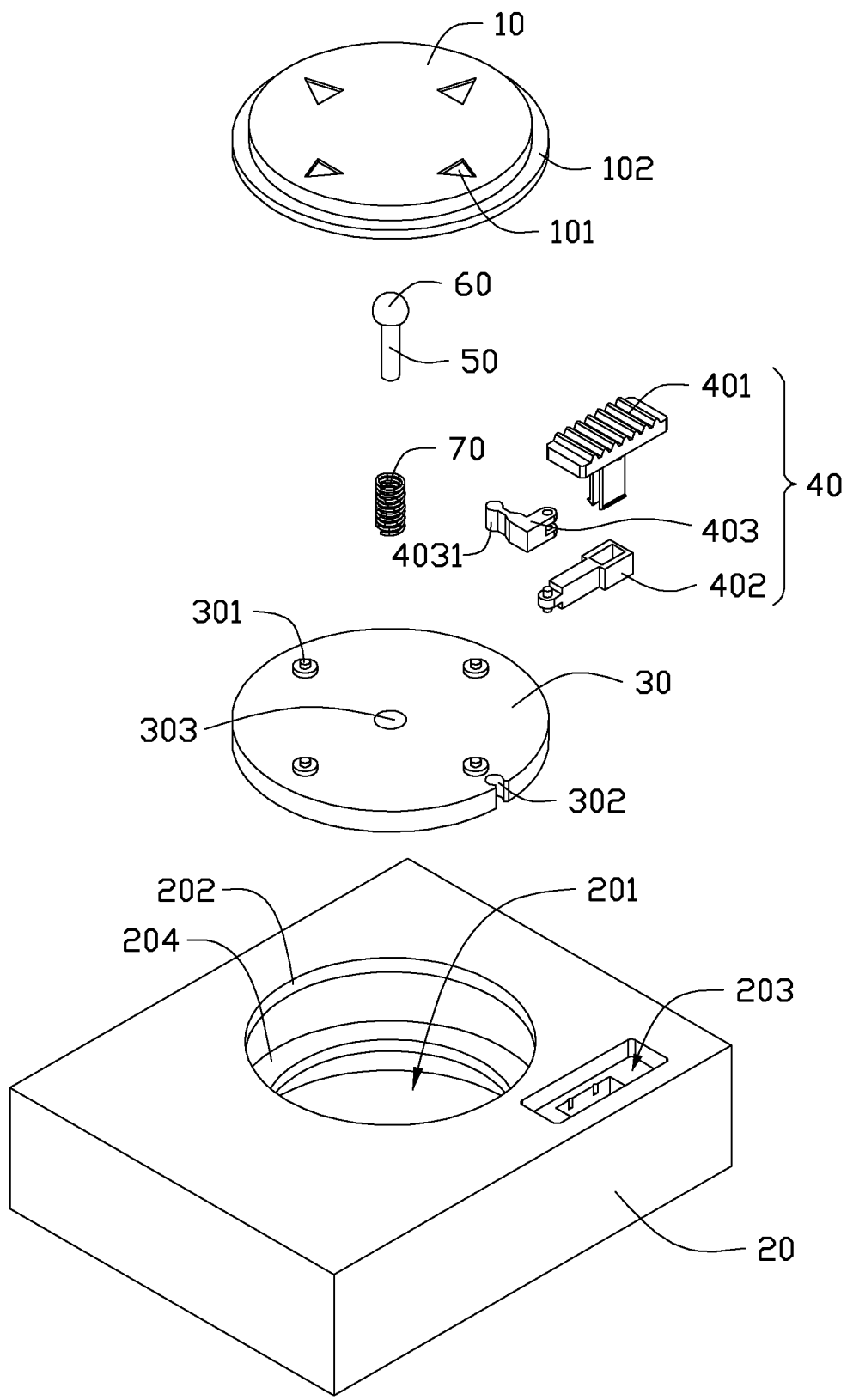
FIG. 2 is an isometric, exploded view of the electronic device of FIG. 1.
Figure 3:
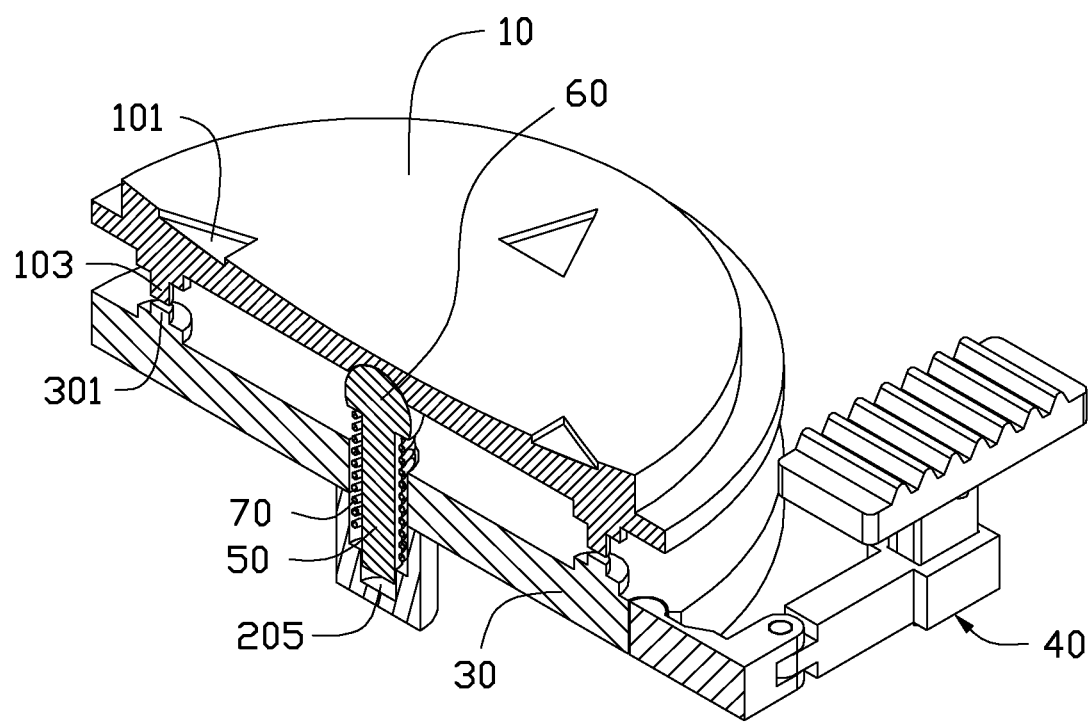
FIG. 3 is a cross-sectional view of the electronic device of FIG. 1 with a case omitted for clarity.

Referring to FIGS. 1-3, an electronic device 100 includes a button body 10, a case 20, a movable pad 30, and a driving member 40. The movable pad 30 is rotatably received in the case 20. The button body 10 is movably attached to the case 20 and positioned above the movable pad 30. At least one switch 301 is arranged on a top surface of the movable pad 30 underneath the button body 10. At least one protruding post 103 which corresponds to the at least one switch 301 is arranged on an internal surface of the button body 10 over the movable pad 30. A switch 301 may be actuated by a corresponding protruding post 103 when the button body 10 is depressed. At least one symbol 101 is arranged on a top surface of the button body 10 to prompt a user to depress that part of the button body 10 which is indicated by the at least one symbol 101. In this embodiment, four switches 301 are arranged on the movable pad 30 symmetrically. Four protruding posts 103 corresponding to the four switches 301 are arranged on the internal surface of the button body 10, and four symbols 101 are arranged at the top surface of the button body 10 correspondingly.

The driving member 40 is slidably arranged in the case 20 and is connected to the movable pad 30, and is configured to move the movable pad 30 between a first position and a second position, in order that when the movable pad 30 is located in the first position, each switch 301 aligns with a corresponding protruding post 103 respectively and is capable of being actuated by the corresponding protruding post 103 when a location of a symbol 101 corresponding to the switch 301 is depressed; when the movable pad 30 is moved away from the first position to the second position, each switch 301 is misaligned with the at least one protruding post 103, and will not be actuated by the at least one protruding post 103 when the button body 10 is depressed.

In this embodiment, a guiding slot 203 is arranged in the top of the case 20 to receive the driving member 40. When the driving member 40 butts against one end of the guiding slot 203, the movable pad 30 is located in the first location. When the driving member 40 is pushed towards the other end of the guiding slot 203, the movable pad 30 is moved from the first location to the second location.

A cavity 302 is formed at the periphery of the movable pad 30. The driving member 40 includes a corresponding blocking end 4031 fit the cavity 302, so that when the driving member 40 is pushed along the guiding slot 203, the movable pad 30 is moved and takes each switch 301 out of alignment with the corresponding protruding post 101. In this embodiment, the driving member 40 includes a sliding button 401, a connection portion 402, and a blocking portion 403. The sliding button 401 is movably received in the guiding slot 203. One end of the connection portion 402 is connected to the sliding button 401, and the other end of the connection portion 402 is connected to one end of the blocking portion 403. The blocking end 4031 is arranged at the free end of the blocking portion 403. In order to prevent slippage, a number of ridges are arranged on the top of the sliding button 401 to increase friction between the sliding button 401 and a user's finger.

A flange 102 extends around the periphery of the button body 10 to form a step structure. A hollow chamber 201 is formed in the case 20. A shoulder (annular shoulder 204) protrudes from an inner surface of the chamber 201. A groove or slot (annular groove 202) is formed between the annular shoulder 204 and the top surface of the case 20. The movable pad 30 is movably received in the hollow chamber 201 and rests on the annular shoulder 204. When each protruding post 103 is located immediately above its corresponding switch 301, the flange 102 of the button body 10 is received in the annular groove 202. Furthermore, the depth of the annular groove 202, which is measured from the up edge side to the down edge side of the annular groove 202, allows the flange 102 of the button body 10 to slant and/or move vertically within a preset range.

The electronic device 100 further includes a supporting rod 50. One end of the supporting rod 50 passes through a through hole 303 of the movable pad 30 and is fixed to the case 20, and the other end supports the button body 10. The movable pad 30 can rotate around the other end of the supporting rod 50. In this embodiment, a ball head 60 is set on the other end of the supporting rod 50 to be arranged between the supporting rod 50 and the button body 10. The ball head 60 is received in a cavity of the button body 10, which forms a ball joint coupling.

The electronic device 100 further includes an elastic member 70. The elastic member 70 is sleeved around the supporting rod 50 and passes through the through hole 303, with its two ends abutting against the underside of the ball head 60 and the case 20. In this embodiment, a stepped socket (chamber 205) is formed in the case 20 to receive the one end of the supporting rod 50 and to form a resisting base against one end of the elastic member 70.

When the position indicated by a symbol 101 on the top surface of the button body 10 is pressed, a switch 301 corresponding to the symbol 101 will be actuated by the protruding post 101 below the symbol 101. During the pressing process, the elastic member 70 is compressed. The button body 10 will return to its normal, elevated position when the press has ceased. In this embodiment, in an initial state, the button body 10 and the movable pad 30 are parallel to each other. The elastic member 70 is a coil spring.

In this embodiment, the button body 10 and the movable pad 30 are substantially discal. The through hole 303 is arranged at the center of the movable pad 30. The ball head 60 on the other end of the supporting rod 50 resists against the center of the button body 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a case;
   a movable pad rotatably received in the case and comprising at least one switch arranged thereon;
   a button body movably attached to the case and positioned above the movable pad, and comprising at least one protruding post corresponding to the at least one switch and facing the movable pad; and
   a driving member slidably arranged in the case and connected to the movable pad, configured to move the movable pad between a first position and a second position, wherein when the movable pad is located in the first position, one or more of the at least one switch align with a corresponding one or more of the at least one protruding post and each of the one or more switches is capable of being actuated by the corresponding protruding post when the button body is depressed; when the movable pad is moved away from the first position to the second position, each switch is misaligned with the at least one protruding post.

2. The electronic device as described in claim 1, wherein the case comprises a guiding slot to receive the driving member, when the driving member butts against one end of the leading slot, the movable pad is located in the first position, and when the driving member is pushed towards the other end of the leading slot, the movable pad is moved from the first position to the second position.

3. The electronic device as described in claim 2, wherein a cavity is formed at the periphery of the movable pad, the driving member comprises a corresponding blocking end fit the cavity, and when the driving member is pushed along the guiding slot, the movable pad is moved and takes each switch out of alignment with the at least one protruding post.

4. The electronic device as described in claim 3, wherein the driving member comprises a sliding button, a connection portion, and a blocking portion, the sliding button is movably received in the guiding slot, one end of the connection portion is connected to the sliding button, the other end of the connection portion is connected to one end of the blocking portion, and the blocking end is arranged at the free end of the blocking portion.

5. The electronic device as described in claim 1, wherein a flange extends around the periphery of the button body to form a step structure, a hollow chamber is formed in the case, a shoulder protrudes from an inner surface of the hollow chamber, a groove or slot is formed between the annular shoulder and a top surface of the case, the movable pad is movably received in the hollow chamber and rests on the annular shoulder, and when each protruding post is located immediately above its corresponding switch, the flange is received in the annular groove.

6. The electronic device as described in claim 5 further comprising a supporting rod, wherein one end of the supporting rod passes through a through hole of the movable pad and is fixed to the case, and the other end of the supporting rod supports the button body.

7. The electronic device as described in claim 6 further comprising an elastic member, wherein a ball head is set on the other end of the supporting rod to be arranged between the supporting rod and the button body, the ball head is received in a cavity of the button body, the elastic member is sleeved around the supporting rod and passes through the through hole, with its two ends abutting against the underside of the ball head and the case.

8. The electronic device as described in claim 7, wherein a stepped socket is formed in the case to receive the one end of the supporting rod and to form a resisting base against one end of the elastic member.

9. The electronic device as described in claim 8, wherein the button body and the movable pad are substantially discal, the through hole is arranged at the center of the movable pad, and the ball head on the other end of the supporting rod resists against the center of the button body.

10. The electronic device as described in claim 1, wherein four switches are arranged on the movable pad symmetrically, four protruding posts corresponding to the four switches are arranged on the internal surface of the button body.

\* \* \* \* \*